US00RE38369E

(19) United States
(12) Reissued Patent
Rückstädter

(10) Patent Number: US RE38,369 E
(45) Date of Reissued Patent: Dec. 30, 2003

(54) COMPUTER WORK STATION (ELASTIC OR MOVABLE) ARM RESTS

(76) Inventor: Hans Rückstädter, Eichengrund 12, D-59227 Ahlen (DE)

(21) Appl. No.: 10/039,337

(22) PCT Filed: Feb. 26, 1998

(86) PCT No.: PCT/EP98/01088

§ 371 (c)(1),
(2), (4) Date: Dec. 16, 1999

(87) PCT Pub. No.: WO98/39995

PCT Pub. Date: Sep. 17, 1998

Related U.S. Patent Documents

Reissue of:
(64) Patent No.: 6,267,336
Issued: Jul. 31, 2001
Appl. No.: 09/380,804
Filed: Dec. 16, 1999

(30) Foreign Application Priority Data

Mar. 7, 1997 (DE) ..... 197 09 481

(51) Int. Cl.[7] ..... B43L 15/00
(52) U.S. Cl. ..... 248/118.3
(58) Field of Search ..... 248/118, 118.1, 248/118.3, 918, 160

(56) References Cited

U.S. PATENT DOCUMENTS 4,069,995 A * 1/1978 Miller ..... 248/118.1
4,390,011 A * 6/1983 Evans ..... 248/118 X
4,822,103 A * 4/1989 Stenvall ..... 248/118 X
5,058,840 A * 10/1991 Moss et al. ..... 248/118.5
5,104,073 A * 4/1992 VanBeek et al. ..... 248/118.3
5,143,422 A * 9/1992 Altdofer et al. ..... 297/411
5,281,001 A * 1/1994 Bergster et al. ..... 248/118 X
5,370,346 A * 12/1994 Long ..... 248/118
5,385,322 A * 1/1995 Kim et al. ..... 248/118
5,560,573 A * 10/1996 Colver et al. ..... 248/118
5,755,650 A 5/1998 Urso ..... 482/138
6,102,344 A * 8/2000 Kasvin et al. ..... 248/118

FOREIGN PATENT DOCUMENTS

DE 452585 * 11/1927
DE 9207271 * 1/1992
FR 1082209 * 12/1954
WO WO 95/28866 * 11/1995

* cited by examiner

*Primary Examiner*—Ramon O. Ramirez
(74) *Attorney, Agent, or Firm*—Brown & Michaels, PC

(57) ABSTRACT

A movable armrest is provided which has a floor support, a support element extending upwardly from the floor support, and a trough-shaped armrest member attached to a top end of the support element, the support element being arranged to move the armrest member horizontally relative to the floor support. The support element may be a rigid rod with at least one spring positioned between the rod and the floor support, or may be an elongated spring, such as a torsion spring, a coil spring, a flat spring or a spiral spring. The support element may have a telescoping feature to permit it to be collapsed for storage and a rotatable joint may be provided between the armrest member and the support element.

24 Claims, 2 Drawing Sheets

COMPUTER WORK STATION (ELASTIC OR MOVABLE) ARM RESTS

Matter enclosed in heavy brackets [ ] appears in the original patent but forms no part of this reissue specification; matter printed in italics indicates the additions made by reissue.

DESCRIPTION

Moveable armrest for computer workplaces which have a vertical, elastic support element which moves parallel to the plane of the desk top, and at the upper end of the support element an elongated, trough-shaped armrest. The invention relates to moveable armrests for computer workplaces. The purpose is to assist protracted precise (mouse) working. But other activities that can be performed at desk level are also supported.

BACKGROUND OF THE INVENTION

Many persons performing work on a keyboard and with a computer mouse suffer muscle cramp, with medical consequences. For ceramic decorators and goldsmiths there are benches (partially raised) which have a round cut-out at the front and so partially surround the persons working there. However, this arrangement cannot be used with computers and in offices as it would probably be considered unacceptable both for space and optical reasons in the case of computer workplaces.

Devices have been invented to be placed on the desk in front of the keyboard and provide support for the wrist. However, this method is inflexible and, because of the friction and the posture of the hands, still unergonomic.

The moveable constructions of the types already invented for fitting on the work desk all suffer from the primary fault that they allow kinetic energy to be transmitted to the desk, that they are too massive and complicated, and that they require maintenance for proper functioning as they otherwise produce noises or do not move easily. They are mostly visually obtrusive. Also the mounting of the rest device on the desk often causes problems.

A support for the forearm for people operating computer mouse is already known from DE 92 07 271 U1. This forearm support has a clamp 1 for setting the device to the desk top, and a pivot mechanism. If the forearm is resting on this support and if, for example, it is desired to move the mouse in a linear direction towards the pivot, this support acts counter to the movement of the forearm by unavoidably moving the fore-arm in an arc, despite an intended straight line movement. The user has to try to compensate the "misguidance" given by this support. This support is therefore unsuitable.

DE 29 10 855 A1 describes a typewriting support for the hands. A long, ovally rounded supporting bar is fitted between two other fork-like bars and provides support for the wrists during typewriting. The fork-like bars are equipped with screw clamps for mounting the device on the desk. The device transmits kinetic energy to the desk and so may disturb the monitor; therefore, sturdy desks are required, which also have to be specially shaped. The device gets in the way of the user's body and also takes up space. Being large, it is visually unattractive. During movement, friction occurs between the support bar and the arms; the user is consciously aware of it and finds it a nuisance. The moving joints have to be serviced. It is evident that this typewriting support is only designed for operating a typewriter keyboard and is neither intended nor suitable for using a computer mouse.

DE-GM 19 83 548 describes a sprung apparatus for supporting the elbows during typing. A hollowed rest for one elbow is mounted on one end of a telescopic strut, and a clamping device for mounting the sprung telescopic strut on the seat of a chair on the other. The construction is fitted to the seat of the chair, so that every movement of the chair transmits a movement to the arm. Problems are also to be expected in resolving the height differences between the desk and the chair, which can mean that only special furniture may have to be used. The telescopic arm requires technical maintenance, otherwise it may easily jam, and it has to be a correspondingly heavy and expensive construction to ensure that it operates reasonably easily. It is virtually obtrusive because of its sizes. It is evident that this elbow support is not suitable for operating a computer mouse, as it even hinders the movement of the forearm required for moving the mouse.

GB 22 52 530 A describes an armrest for supporting the forearm of a typist. As already detailed in the first reference described above, this proposal for a forearm support only involves the use of three joint 18, 26 and 32, located between two arms 20 and 28. The first joint 32 is mounted on a device which can be clamped to a table and is rotatable in one plane; the second arm 20 is mounted on the middle joint 26 and is vertically rotatable on the same axis, and the outer end of the second arm 20 is provided with a hollowed armrest 12 which has a pivoted mount. As already detailed in the first reference described above an arrangement of this kind acts counter to the movement of the forearm during operation of a computer mouse, so that the user has to additionally concentrate on the "misguidance" caused by this construction, and has difficulty compensating this misguidance. It destroys kinetic energy through friction in the joints, which in turn can only be reduced by special (ball) bearings. The clamp fixings on the desk can work loose and may damage the desk. The construction can only be removed with difficulty by releasing the screws when it is not required. It is obstructive and takes up space on the desk top. This device is therefore likewise not suitable, and not intended, for the operation of a computer mouse.

U.S. Pat. No. 5,472,161 describes a support for the wrists during the operation of a typewriter keyboard. This known support consists of a bracelet on which a kind of "wheeled trolley" is fitted that lifts and supports the wrists and can be moved about on the desk. This device has to be strapped to and unstrapped from the arm every time it is used, and it may cause problems to the skin of the user's wrist. The desk top always has to be clear. The height of the arm is not adjustable, or only to a limited extent. Movement towards the back of the desk top is restricted, as the rollers are impeded by the keyboard or other objects. The rollers have to be serviced because if they do not run easily, through soiling, they are more of a hindrance than a help. This arm support is neither suitable nor intended for the operation of a computer mouse. A wrist support of this kind on rollers would constantly come up against the mouse pad and would only hinder operation of the mouse.

U.S. Pat. No. 4,822,103 relates to a forearm support which is mounted on the left and right of a chair seat. A vertical arm 3 is provided at its upper end with a support 1, which is ball-mounted and can move forwards and backwards following the movement of the forearm. When no force is exerted by the forearm, springs 9 and 10 return the support 1 to its initial position. This known forearm support is neither suitable nor intended for supporting the forearm during the operation of a computer mouse. Because of its design, it only supports the operation of operating controls which are located in the immediate vicinity of the user's chair. Moreover, it only supports a forward and backward movement of the forearm. This forearm support is specifically designed for moving a lever or such like forwards and in a straight line from a rest position into an operating position and back, as it returns the forearm to the initial position via springs 9 and 10. It is evident that such a support is unsuitable for the operation of a computer mouse and indeed would hinder such use, as the user is already sufficiently occupied with preventing the return of his forearm to the initial position.

FR 1 082 209 A describes a forearm support for location between the seats of a vehicle. This device is adjustable for height and has a support surface 26 which, adjusted to the seat position of the occupant of the seat, can be moved forwards and backwards and fixed in a pre-set position. It is evident that this device is neither suitable nor intended for supporting the forearm during the operation of a computer mouse.

Finally, U.S. Pat. No. 4,069,995 describes an arm support with three or more pliant support elements 12, 14 and 16, arranged vertically in a regular polygon between a (complicated) desk 18 and a base plate 20 (which can be viewed as a foot). In the center of the base plate 20 is a height adjustable cylinder 38 which is provided at its top with a forearm support 22 which is (only) tiltable by means of a pivot 34; as a result, the support always falls into an inclined position when not in use. If the forearm is moved from its resting position, the desk also moves, whereby the desk 18 remains parallel to the base plate 20. If the force exerted by the forearm is released, the arrangement returns the forearm to its resting position by means of the pliant supports. This armrest is mounted on the side of the seat of the chair on which the user is sitting and is therefore not suitable nor intended for free-standing use on the floor, and is therefore neither suitable nor intended for the operation of a control element lying or standing on a desk, such as a computer mouse. Additionally, the degree of movement allowed would be too small for the operation of a computer mouse or the like, and the constant return of the forearm to its resting position would be inconvenient. This armrest is very complicated in design and complicated to manufacture, making it expensive, clumsy and unacceptable.

SUMMARY OF THE INVENTION

The invention has the goal of providing a moveable armrest which facilitates the operation of a computer mouse or other control element at a computer workplace. The armrest should also be very easy to fold down and put away when not in use.

This goal is met by utilizing only one support element of a rod design, rising from the floor. The moveable armrest on its long strut can be seen as a lever and allows easy movement in a quasi-level plane. The armrest itself is comfortable with slight vertical springing. Rotation movements of the arm and movements parallel to the desk are therefore possible without difficulty. Different versions of the invention are explained with reference to the drawing (FIGS. 1–5).

DETAILED DESCRIPTION OF THE PREFERRED EMBODIMENTS

Figure 1:
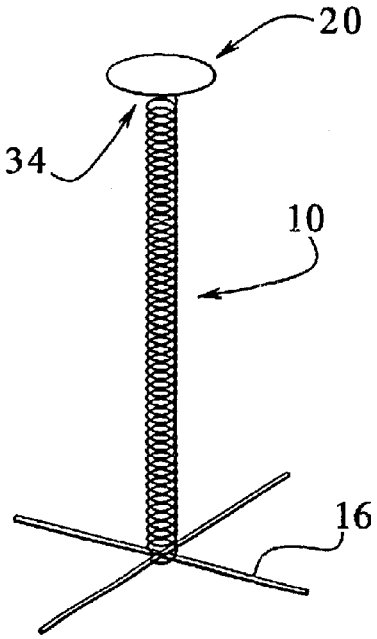
FIG. 1 schematically illustrates, in a perspective view, a first embodiment of a movable armrest according to the present invention.
Figure 2:
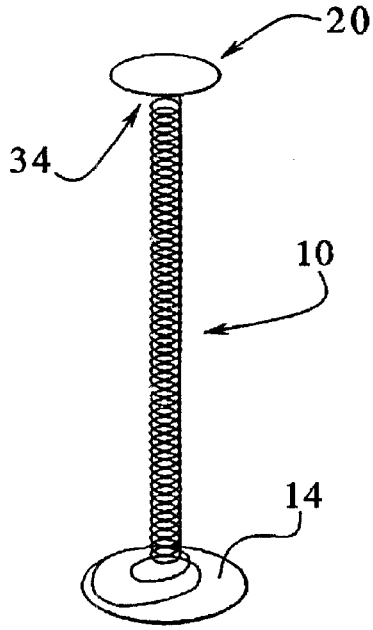
FIG. 2 schematically illustrates, in a perspective view, a second embodiment of a movable armrest according to the present invention.

Several different embodiments of the invention are shown in FIGS. 1–5. In each figure there is shown a support 10 mounted in a stand 12 on the floor. A wire circle 14 (FIG. 2) with 3 feet and/or a cross 16 (FIG. 1) or tripod offer themselves as alternatives to a plate, which consumes more material. The vertical stand 10 from the floor to an armrest 20 can be slightly elastic. This will facilitate movement of the user's arm at the top. The strut can be made rigid of steel (FIG. 5), elastic of glass fiber (FIG. 4), or of a coiled spring (FIGS. 1,2) (possibly also with different radii) or flat spring (FIG. 3) in order to allow the armrest mounted on the top sufficient movement. One or two torsion, coil or spiral springs 22 (FIG. 5) (at the foot of the strut) also allow movement at the top.

A telescopic rod 24 (FIG. 5) allows the device to be collapsed for storage when not in use. Another advantage is the easy adjustability of the height of the device. Spring mounted catches 26 (FIG. 5) in the adjustable tubes allow the height to be easily and firmly, but not permanently, set. A wing nut could also be used for fixation. Also several insertable spacers could be used for this purpose. When the support is not in use, the top section can be folded down, making it smaller and easier to store.

Figure 3:
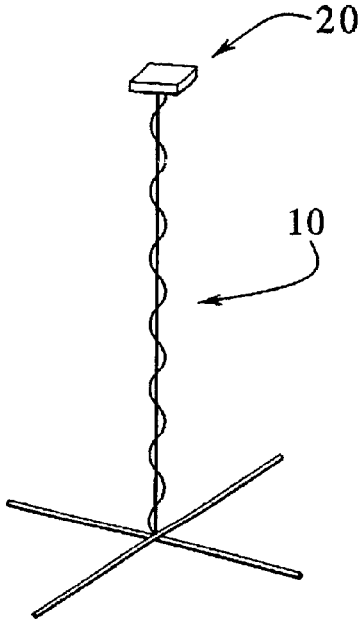
FIG. 3 schematically illustrates, in a perspective view, a third embodiment of a movable armrest according to the present invention.
Figure 4:
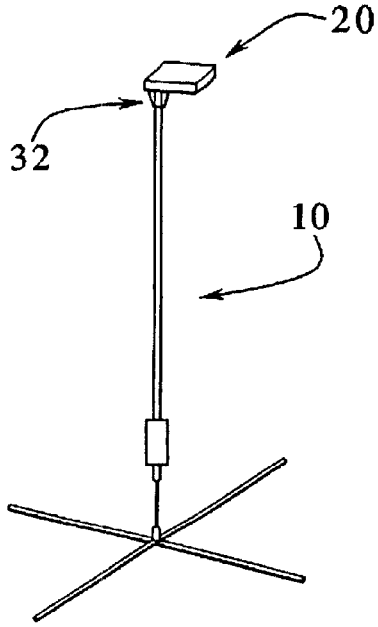
FIG. 4 schematically illustrates, in a perspective view, a fourth embodiment of a movable armrest according to the present invention.
Figure 5:
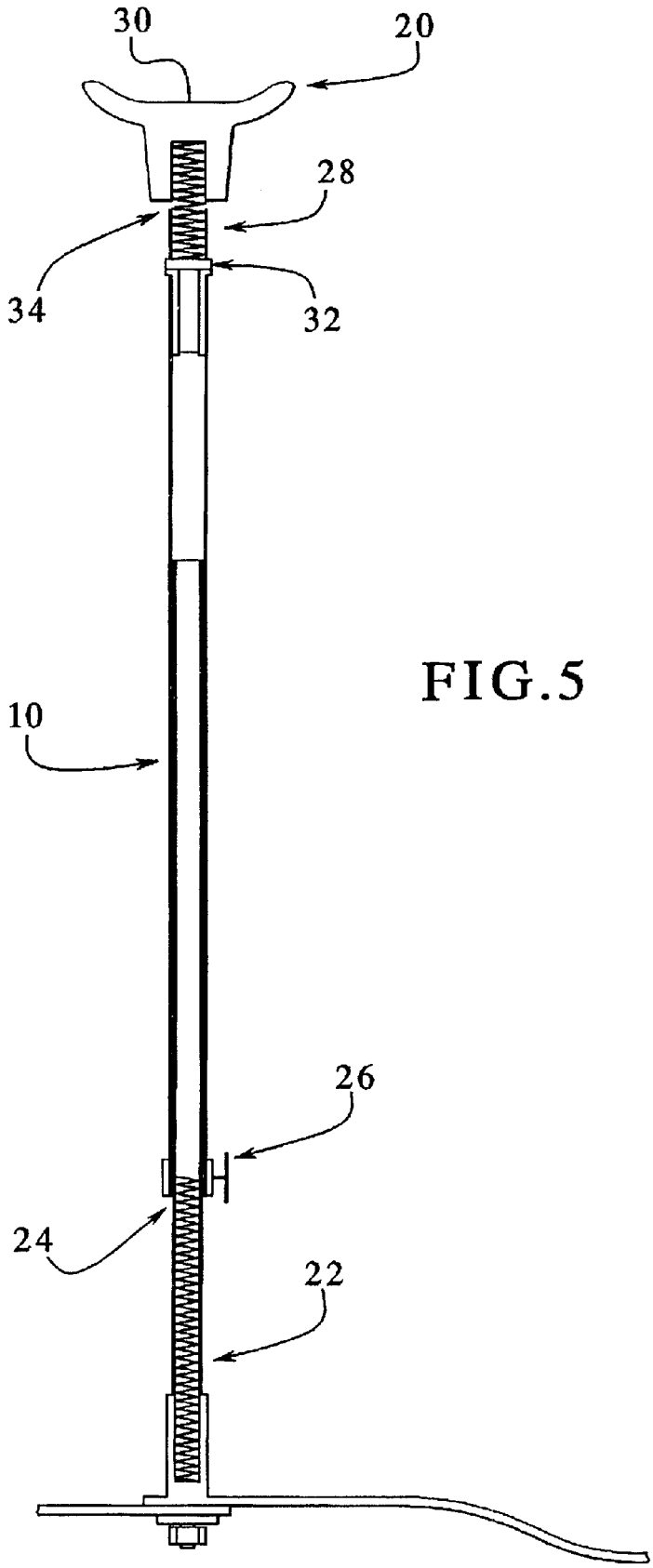
FIG. 5 schematically illustrates, in a perspective view, a fifth embodiment of a movable armrest according to the present invention.

A (possibly padded) rounded armrest 20 (towards the hand and downwards), is kind to the skin and clothing. An additional spring 28 (FIG. 5) can also be fitted (with flat or coil spring) near the armrest. The shape of the armrest 20 can be round (FIGS. 1, 2) or oval (approx. max. 10 cm long (FIGS. 3, 4). A longitudinal depression 30 (FIG. 5) along the top allows good arm contact, supporting the (rotational) movement while preventing the arm for sliding off. The armrest (20) should at any rate have a rotating device 32 or pivot 34 at the point where it is fixed to the strut 10 such as by an additional joint. The structure of the armrest 20 at the end nearest the desk should be as thin as possible in order to avoid contact with the desk.

The armrest is noiseless, vertically and horizontally elastic, requires virtually no maintenance and can be moved almost unnoticed by the user in any direction on a (notional) plane. The arm is free, as it only restores on the device, and after a short time ceases to take any notice of it. All the things on the table or on the level of the table can be easily reached. Through the springs, the armrest is always in the same initial position, so the user can place his arm on it blindly. The device is very easy to produce and nevertheless fully functional, and the use of a computer mouse or the operator of a control element at a machine workplace can operate the mouse or control element without his movements being restricted or hindered in any way by the armature as per the invention. The armrest as per the invention allows virtually "weightless" movement of the forearm without the hand position becoming cramped, so preventing tension or fatigue.

In a specially advantageous version of the invention, the device consists of springs and a height adjustable telescopic element. This means that it can be adjusted as needed, folded down and placed out of the way under the desk.

As is apparent from the foregoing specification, the invention is susceptible of being embodied, with various alterations and modifications which may differ particularly from those that have been described in the preceding specification and description. It should be understood that I wish to embody within the scope of the patent warranted hereon all such modifications as reasonably and properly come within the scope of my contribution to the art.

The invention is claimed as:

1. A movable armrest with a vertically arranged elastic support element which is *substantially* horizontally movable at an upper end and with an arm support member at the upper end of the support element, which arm support member is movable substantially horizontally as said support element is moved [through a predetermined angle of movement, consisting] *wherein said support element consists* of only one support element of rod design, extending from the floor.

2. A movable armrest according to claim 1, wherein said support element consists of a rigid rod with an additional spring in the form of one of a torsion spring, a coil spring and a helical spring at a bottom end of said rod.

3. A movable armrest according to claim 2, wherein said support element is also equipped with sliding telescopic tubes, adjustable in length, and fixable at a desired length by one of a screw or a spring-mounted catch.

4. A movable armrest according to claim 3, wherein said arm support member is rotatable against the support element by means of an additional joint in or against the support element.

5. A movable armrest according to claim 2, wherein said arm support member is rotatable against the support element by means of an additional joint in or against the support element.

6. A movable armrest according to claim 2, wherein said support element comprises a further spring.

7. A movable armrest according to claim 1, wherein said support element consists of an elastic rod, preferably made of glass fiber.

8. A movable armrest according to claim 7, wherein said support element is also equipped with sliding telescopic tubes, adjustable in length, and fixable at a desired length by one of a screw or a spring-mounted catch.

9. A movable armrest according to claim 8, wherein said arm support member is rotatable against the support element by means of an additional joint in or against the support element.

10. A movable armrest according to claim 7, wherein said arm support member is rotatable against the support element by means of an additional joint in or against the support element.

11. A movable armrest according to claim 7, wherein said support element comprises a further spring.

12. A movable armrest according to claim 1, wherein said support element consists of at least one of a spiral spring, a coil spring, a flat spring or torsion spring.

13. A movable armrest according to claim 12, wherein said spring is coiled with different radii along their length.

14. A movable armrest according to claim 13, wherein said support element is also equipped with sliding telescopic tubes, adjustable in length, and fixable at a desired length by one of a screw or a spring-mounted catch.

15. A movable armrest according to claim 14, wherein said arm support member is rotatable against the support element by means of an additional joint in or against the support element.

16. A movable armrest according to claim 12, wherein said support element is also equipped with sliding telescopic tubes, adjustable in length, and fixable at a desired length by one of a screw or a spring-mounted catch.

17. A movable armrest according to claim 16, wherein said arm support member is rotatable against the support element by means of an additional joint in or against the support element.

18. A movable armrest according to claim 12, wherein said arm support member is rotatable against the support element by means of an additional joint in or against the support element.

19. A movable armrest according to claim 13, wherein said arm support member is rotatable against the support element by means of an additional joint in or against the support element.

20. A movable armrest according to claim 12, wherein said support element comprises a further spring.

21. A movable armrest according to claim 1, wherein said support element is also equipped with sliding telescopic tubes, adjustable in length, and fixable at a desired length by one of a screw or a spring-mounted catch.

22. A movable armrest according to claim 21, wherein said arm support member is rotatable against the support element by means of an additional joint in or against the support element.

23. A movable armrest according to claim 1, wherein said arm support member is rotatable by means of an additional joint in or against the support element.

24. A movable armrest according to claim 1, wherein said arm support member is formed as an oval or elongated trough.

* * * * *